No. 659,539. Patented Oct. 9, 1900.
C. A. LINDSTROM.
SUPPORTING DEVICE FOR ELECTRIC MOTORS.
(Application filed Oct. 16, 1899.)

(No Model.)

Witnesses:
M. Fiel.
D. F. Martin

Inventor:
Charles A. Lindstrom
By Frank D. Thomason
Atty

UNITED STATES PATENT OFFICE.

CHARLES A. LINDSTROM, OF CHICAGO, ILLINOIS, ASSIGNOR, BY DIRECT AND MESNE ASSIGNMENTS, TO THE HEWITT-LINDSTROM MOTOR COMPANY, OF SAME PLACE.

SUPPORTING DEVICE FOR ELECTRIC MOTORS.

SPECIFICATION forming part of Letters Patent No. 659,539, dated October 9, 1900.

Application filed October 16, 1899. Serial No. 733,699. (No model.)

*To all whom it may concern:*

Be it known that I, CHARLES A. LINDSTROM, a citizen of the United States, and a resident of Chicago, Cook county, Illinois, have invented certain new and useful Improvements in Supporting Devices for Electric Motors, of which the following is a full, clear, and exact description, reference being had to the accompanying drawings.

The object of my invention is to provide a support for the motors, more particularly of an electric automobile, which will retain the motor in its relative position to the driving-gear of the vehicle and prevent longitudinal or lateral displacement of the same and at the same time cushion it in such manner that it does not receive the jar or concussion due to the travel of the vehicle by which it would otherwise be affected if it were rigidly attached to the frame of the same. This I accomplish by the means hereinafter fully described and as particularly pointed out in the claims.

Figure 1:
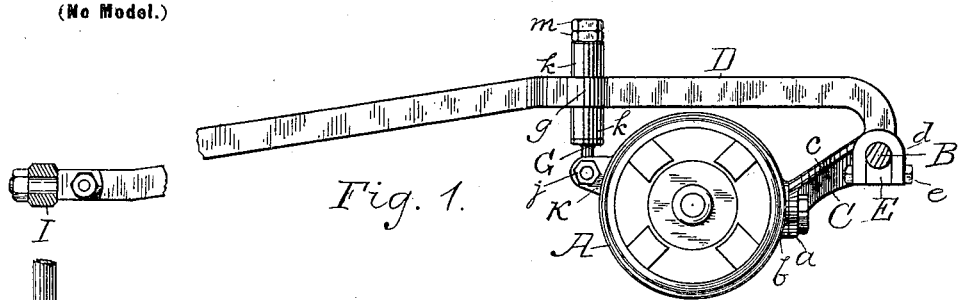
Figure 2:
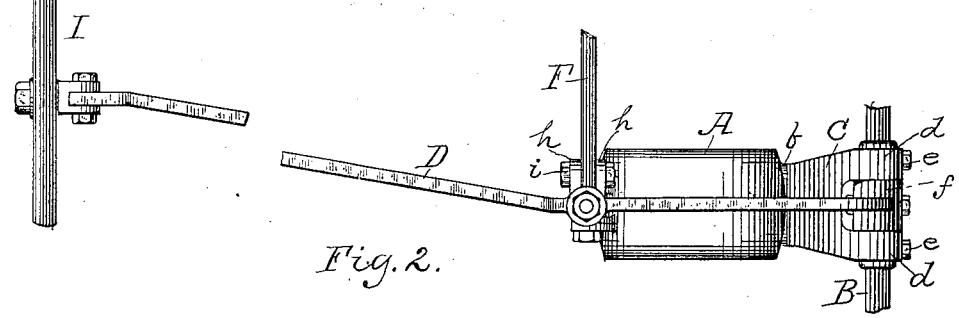
Figure 3:
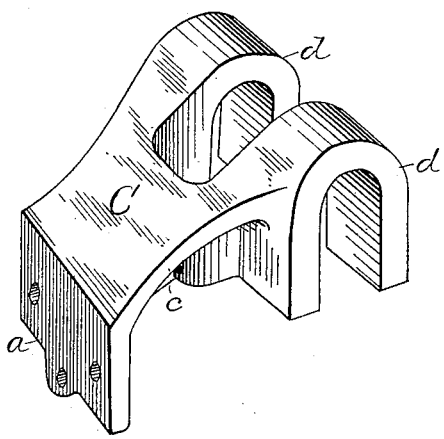

In the drawings, Figure 1 is a side view of my improvement detached from the vehicle. Fig. 2 is a plan view of about one-half of the said supporting-frame, and Fig. 3 is a perspective view of the hanger-bracket.

In the drawings, A represents the motor-frame.

B represents the axle of the vehicle.

C represents a hanger-bracket, and D the reach of the supporting-frame.

The bracket C consists of an attaching-plate $a$, which is preferably of rectangular proportions and is secured to a boss $b$, made integrant with the motor frame or ring by bolts or otherwise. Projecting obliquely upward from this attaching-plate is an arm $c$, the upper rear end of which is forked or bifurcated. The upper edge of the arm is flanged horizontally, so as to reinforce and strengthen the said arm and enable it to better withstand the strain to which it is subjected in supporting the motor. The rear ends of the bifurcations of arm $c$ of this bracket are provided with inverted-U-shaped knuckles or clips $d$ $d$, which are preferably integrant with said bracket and are slipped over and supported by axle B. The bracket is secured to the axle by means of bolts $e$ $e$ passing through the lower ends of the parallel branches of said clips $d$ and through the filler-block E, placed between the same, and the lateral displacement of the bracket is prevented either by making circumferential flanges on the axle, between which the bracket is placed, or in any other suitable manner.

The rear end of the reach D is bent downward to and has a boss or knuckle $f$, that is journaled on the axle in the space snugly between the clips or knuckles $b$ of the bracket. Reach D extends horizontally forward and arches over the motor A and at a point slightly in front of the motor is provided with a boss $g$, having a vertical opening therethrough, and also with two laterally-projecting corresponding lugs $h$ $h$. The contiguous end of a cross-link F is inserted between and pivotally connected to the lugs $h$ by a bolt $i$, and passing vertically up through the boss $g$ of said reach is a suspending-rod G, the lower end of which is pivotally connected, by means of a suitable bolt $j$, to a lug K, projecting forward from the front portion of the motor-frame A. Just above this lug K the rod G is reduced to provide a shoulder, and between this shoulder and the reach a rubber gasket or cushion $k$ is placed. A similar gasket $k$ is placed on said rod above the reach, and the whole arrangement is retained in position by the lock-nuts $m$ $m$ on the screw-threaded upper end of said rod. When properly assembled, the gaskets $k$ $k$ thoroughly cushion the motor-frame and absorb or neutralize most of the jar of the vehicle motion and prevent that pounding which is experienced by the occupants of like vehicles in which the motor-frame is rigid to the running-frame of the same.

The reach D extends forward in a downwardly and laterally oblique direction to the forward cross-frame I of the running-gear, to which it is suitably attached; but as I do not wish to be considered as herein making the particular manner of attachment of the forward end of the reach to the said cross-frame I the subject of this application the details of construction of such attachment are unnecessary.

What I claim as new is—

1. The combination in an automobile with the axle of the drive-gear, and a motor-frame, of a bracket rigidly connected at one end to said motor-frame and having its opposite end bifurcated and each provided with suitable clips for pivotally connecting the same to said axle, filler-blocks and bolts for said clips, and a reach having one end provided with a knuckle which is pivotally connected to said axle between said clips, and to which the opposite side of said motor-frame is yieldingly secured.

2. In an automobile the combination with the motor-frame, of a supporting-bracket consisting of an attaching-plate rigidly secured to said motor-frame an upwardly-inclined arm projecting from said attaching-plate the upper edge of which is flanged laterally and the upper end of which is bifurcated and each of said bifurcations provided with inverted-U-shaped clips and filler-blocks and bolts for said clips, as and for the purpose set forth.

CHARLES A. LINDSTROM.

Witnesses:
 NILS F. ARVEDSÖN,
 FRANK D. THOMASON.